United States Patent [19]

Hynninen

[11] Patent Number: 5,013,454
[45] Date of Patent: May 7, 1991

[54] METHOD OF REMOVING ORGANIC SUBSTANCES FROM EFFLUENTS FROM PULP AND PAPER MANUFACTURING PROCESSES

[75] Inventor: Pertti Hynninen, Helsinki, Finland

[73] Assignee: A. Ahlstrom Corporation, Finland

[21] Appl. No.: 474,020

[22] PCT Filed: Oct. 6, 1988

[86] PCT No.: PCT/SE88/00512
§ 371 Date: Oct. 29, 1990
§ 102(e) Date: Oct. 29, 1990

[87] PCT Pub. No.: WO89/03911
PCT Pub. Date: May 5, 1989

[30] Foreign Application Priority Data
Oct. 27, 1987 [SE] Sweden .................................. 8704167

[51] Int. Cl.$^5$ .............................................. C02F 1/54
[52] U.S. Cl. ..................................... 210/718; 210/725; 210/728; 210/730; 210/928; 162/29; 162/38; 162/39
[58] Field of Search ............... 210/718, 725, 728, 730, 210/928; 162/29, 38, 39

[56] References Cited

U.S. PATENT DOCUMENTS

| | | | |
|---|---|---|---|
| 2,046,110 | 6/1936 | Elian | 210/718 |
| 3,531,370 | 9/1970 | Gould | 162/29 |
| 4,420,369 | 12/1983 | Eaton et al. | 162/29 |
| 4,761,238 | 8/1988 | Hynninen | 210/725 |
| 4,812,207 | 3/1989 | Gullichsen et al. | 162/29 |
| 4,842,688 | 6/1989 | Gullichsen et al. | 162/29 |

Primary Examiner—Peter Hruskoci
Assistant Examiner—Krisanne Shideler
Attorney, Agent, or Firm—Nixon & Vanderhye

[57] ABSTRACT

A method of removing dissolved and colloidal macromolecular organic substances from effluents from processes used in the manufacture of pulp and paper, wherein an acid sludge containing cellulose fibres and being acidified to a pH value of 1.6–2.5, is added to an effluent containing said organic substances, and the pH value is adjusted to 4.5–6.0 before the mixture is subjected to sedimentation to achieve precipitation of the fibres with said organic substances adhered thereto. According to the invention the fibres used as precipitant are subjected to mechanical treatment prior to said acidification, so that the fibres are broken and split open, increasing their specific fibre surface and thereby their ability to catch the organic substances in the effluent.

20 Claims, 1 Drawing Sheet

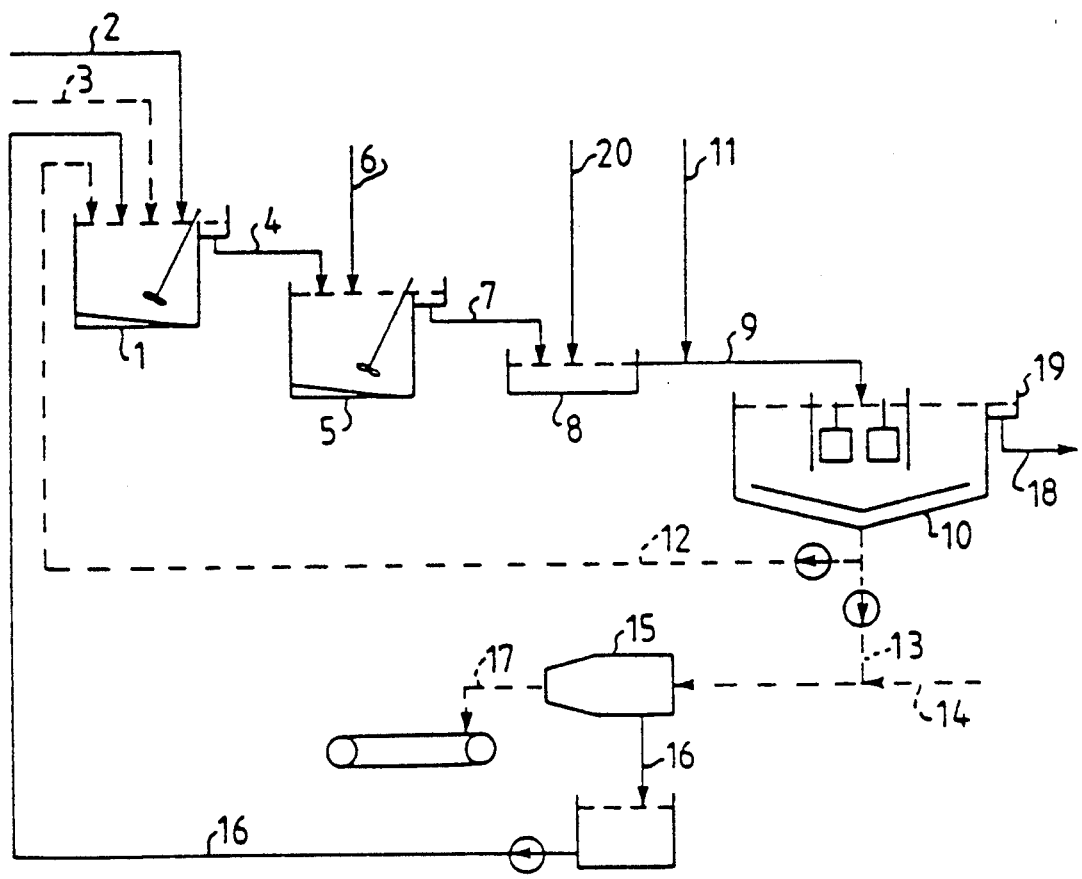

METHOD OF REMOVING ORGANIC SUBSTANCES FROM EFFLUENTS FROM PULP AND PAPER MANUFACTURING PROCESSES

The present invention relates to a method of removing dissolved and colloidal macro-molecular organic substances from effluents from processes used in the manufacture of pulp and paper, wherein an acid sludge containing cellulose fibres and being acidified to a pH value of 1.6-2.5, is added to an effluent containing said organic substances, and the pH value is adjusted to 4.5-6.0 before the mixture is subjected to sedimentation to achieve precipitation of the fibres with said organic substances adhered thereto.

The method described above is known through WO 86/03236 and WO 86/04888 and is particularly effective for reducing the lignin content in bleach plant effluents. The results obtained by using this method are equivalent to those obtained through chemical precipitation using chemicals such as aluminium sulphate. Parameters such as COD (chemical oxygen demand), colour and BOD (biological oxygen demand) are taken into consideration in this comparison. However, claims are being made for even more efficient cleaning of the effluents, particularly with respect to the lignin content.

It is therefore an object of the invention to achieve an improved method enabling still greater quantities of macro-molecular organic substances to be removed from the effluents. By the expression "macromolecular organic substances" it is meant organic substances having a molecular size mainly above 500.

The novelty of the invention lies substantially in that the fibres used as precipitant are subjected to mechanical treatment prior to said acidification so that the fibres are broken and split open, increasing their specific fibre surface and thereby their ability to catch the organic substances in the effluent. Depending on the type of fibres, the mechanical treatment is performed so that the specific surface of the fibres is then generally greater than 1.3 $m^2/g$.

BRIEF DESCRIPTION OF THE DRAWINGS

The invention will be described in more detail with reference to the accompanying drawing and some examples, wherein FIG. 1 shows schematically the flow schedule of an installation for removing dissolved and colloidal macro-molecular organic substances according to the invention, from effluents from a displacement bleaching process.

Referring now to the drawing, 1 denotes a mixing vessel for an acid phase of the process. An acid effluent 2 from the chlorine phase and dioxide phase of a displacement bleaching process is supplied to the mixing vessel 1, together with a sludge 3 of cellulose fibres obtained from a treated effluent from a pulp or paper mill. Before being supplied to the mixing vessel 1 the fibre sludge is subjected to a beating operation or some other mechanical treatment giving the fibres greater specific surface. After remaining in the mixer 1 for 2-4 minutes, the acid fibre sludge 4 is transferred to a mixer 5 for an alkaline phase of the process. An alkaline effluent 6 from said displacement bleaching process is added to the mixer 5 and after a period of 6-10 minutes the mixture 7 of fibre sludge and effluent is transferred to a mixing trough 8. Here CaO is added and treatment is carried out for 3-5 minutes. A cationic polymer 11 is added before the mixture 9 containing CaO is introduced to a sedimentation tank 10. The fibres with the organic material adhering to them are precipitated in the sedimentation tank. A portion 12 of this precipitate is recirculated to the mixing vessel 1 for reuse of the fibres while the remainder 13, to which a polymer 14 may be added, is supplied to a centrifuge 15 for dewatering. The water 16 separated out is recirculated to the mixing vessel 1 while the filtrate 17 (fibres and organic material) is removed from the plant. The effluent 18 at the overflow 19 is conveyed to an equipment for biological treatment.

The following examples further illustrate the invention.

EXAMPLE 1

In this example bleached and unbleached kraft pulps were used as precipitant. The fibres therein were subjected to a beating operation to increase their surface area. The beating process broke and split open the fibres, giving them an irregular shape and split parts and thus considerably increasing their specific surface.

Each suspension of beaten fibres was acidified with acid effluent obtained from a bleaching process, the acid effluent constituting ⅔ of the total volume of added effluents. The final pH value was between 1.8 and 2.1, the object of this pH adjustment being to increase the zeta-potential of the sludge to 0.

3 gram fibres, calculated as solid material, was used for every liter of the total quantity of effluents. The quantity of fibres shall be from approximately half up to twice the quantity COD in the effluent to be treated.

The acid fibre suspension was mixed with an alkaline effluent from the bleaching plant, which constituted ⅓ of the total volume of added effluents. Calcium oxide was added to adjust the pH value of the mixture to between 4.8 and 5.3. 2 milligrams per liter total effluent of a cationic polymer under the designation Allied Colloids Magnafloc 352 were also added. The mixture was then allowed to settle for two hours, after which samples of the precipitate of fibres and organic substances adhered thereto were taken in order to determine the reduction in COD (chemical oxygen demand) as a function of the beating degree (freenes) expressed as °SR (Shopper-Riegler).

Two test series were carried out with the difference that air in the mixture was removed in test No. 2 by means of an evacuating system whereas such an extra step was not carried out in test No. 1. Such air will be entrapped in the fibre sludge during the beating operation and may reduce the settling ability of the fibres. An increased settling velocity was noted in test No. 2 compared with test No. 1. The results obtained by the tests with respect to the reduction of COD (chemical oxygen demand) are shown in Table 1. A higher freenes will give a greater fibre surface. It is evident from these results that the COD reduction increased in relation to the reference sample and the unbeaten sample in each series in an unexpected way when the freenes and thereby the specific fibre surface increased.

The influence of the beating on the zeta-potential, mV/cm, at various pH values was measured in the fibre sludges used and was found to have altered negligibly.

TABLE I

| Pulp | Freenes °SR | Conc. g/l | Spec. surf. cm²/g | COD Conc. mg/l | COD Reduction % |
|---|---|---|---|---|---|
| Test No. 1 | | | | | |
| Bleached | ref. sample | | | 5400 | — |
| Bleached | unbeaten | 3 | 14500 | 3900 | 28 |
| " | 17.0 | " | 23000 | 3500 | 35 |
| " | 22.0 | " | 23500 | 3700 | 31 |
| " | 31.5 | " | 29200 | 3600 | 33 |
| | ref. sample | | | 5400 | — |
| Unbleached | unbeaten | 3 | 14600 | 3900 | 28 |
| " | 17.5 | " | 18300 | 3700 | 31 |
| " | 21.5 | " | 22500 | 3700 | 31 |
| " | 34.5 | " | 29400 | 3300 | 39 |
| Test No. 2 | | | | | |
| | ref. sample | | | 4800 | — |
| Bleached | unbeaten | 3 | 14500 | 3700 | 23 |
| " | 17.0 | " | 23000 | 3500 | 27 |
| " | 22.0 | " | 23500 | 3400 | 29 |
| " | 31.5 | " | 29200 | 3500 | 27 |
| | ref. sample | | | 5000 | — |
| Unbleached | unbeaten | 3 | 14600 | 3700 | 26 |
| " | 17.5 | " | 18300 | 3500 | 30 |
| " | 21.5 | " | 22500 | 3600 | 28 |
| " | 34.5 | " | 29400 | 3300 | 34 |

EXAMPLE 2

In this example beaten and unbeaten (control) fibres from pulps were used as precipitant. Sludges of these fibres were prepared in tap water and acidified with sulphuric acid to a pH value between 1.8 and 2.0. The zeta-potential of the suspensions was 0.

1 gram of fibres, calculated as solid material, was used for each liter of effluent to be treated.

The acid fibre sludge was mixed with an ultra-filtered alkaline effluent from a displacement bleaching process. Calcium oxide was added to adjust the pH value to between 4.8 and 5.3. 2 milligrams of a cationic polymer under the designation Allied Colloids Magnafloc 352 were also added per litre effluent. The mixture was then allowed to settle for one hour, after which samples of the precipitate of fibres and organic substances adhered thereto were taken. The precipitate was filtered through a coarse filter paper.

The specific surface of the fibres and the COD were determined stating the reduction in COD in comparison with the reference samples. The results are shown in the following Table II.

TABLE II

| Pulp | Freenes °SR | Conc. g/l | Spec. surf. cm²/g | COD Conc. mg/l | COD Reduction % |
|---|---|---|---|---|---|
| Bleached | ref. sample | | | 660 | |
| Bleached | unbeaten | 0.8 | 14500 | 227 | 66 |
| " | 17.0 | " | 23000 | 160 | 76 |
| " | 22.0 | " | 23500 | 165 | 77 |
| " | 31.5 | " | 29200 | 111 | 83 |
| | ref. sample | | | 635 | |
| Unbleached | unbeaten | 0.8 | 14600 | 360 | 43 |
| " | 17.5 | " | 18300 | 205 | 68 |
| " | 21.5 | " | 22500 | 164 | 74 |
| " | 34.5 | " | 29400 | 160 | 75 |

The results thus show that beating the pulp to increase the fibre surface gives a substantial and unexpectedly improved precipitation of lignin from the effluent.

During the mechanical treatment the fibres are broken and split open, thus becoming irregular in shape and opened up so that their specific surface is considerably increased. Microscopic examination of the precipitate obtained by the method according to the invention showed that the macro-molecular organic material adhered to the fibres particularly at the break points or other surface irregularities in the fibres forming an irregular network. These break points and surface irregularities appear to function as growth centres for the macro-molecular organic material. Examination also showed that the macro-molecular material was caught more efficiently by a tight network of the irregular fibres than by a thin network.

We claim:

1. A method of removing dissolved and colloidal macro-molecular organic substances from effluents from processes used in the manufacture of pulp and paper, comprising the steps of:
    (a) subjecting cellulose fibers to mechanical treatment so that the fibers are broken and split open, increasing the specific fiber surface thereof and their ability to catch organic substances in the effluent;
    (b) mixing the fibers from step (a) with an acid sludge so that a first mixture having a pH value of about 1.6–2.5 is formed;
    (c) mixing the first mixture of fibers and acid sludge from step (b) with said effluent containing dissolved and colloidal macro-molecular organic substances to produce a second mixture;
    (d) if necessary, adjusting the pH of the second mixture to about 4.5–6.0; and
    (e) subjecting the second mixture of fibers and effluent from steps (c) and (d) to sedimentation so that the fibers precipitate out of the mixture, with macro-molecular organic substances adhered thereto.

2. A method as recited in claim 1 wherein step (a) is practiced by subjecting the fibers to a beating operation.

3. A method as recited in claim 2 wherein step (a) is practiced utilizing fibers obtained from a pulp or paper mill.

4. A method as recited in claim 3 wherein step (a) is practiced so that after treatment the fibers have a specific surface greater than 1.3 m²/g.

5. A method as recited in claim 1 wherein step (a) is practiced so that after treatment the fibers have a specific surface greater than 1.3 m²/g.

6. A method as recited in claim 5 comprising the further step (f), between steps (c) and (e), of subjecting the mixture to mechanical treatment so as to remove air from the mixture prior to sedimentation.

7. A method as recited in claim 1 wherein step (a) is practiced utilizing fibers obtained from a pulp or paper mill.

8. A method as recited in claim 1 wherein step (c) is practiced so that the quantity of fibers added, calculated as solid material, is 1–20 grams per liter of the total quantity of treated effluent, and constitutes about 0.5–2 times the quantity of COD in the effluent.

9. A method as recited in claim 8 comprising the further step (f), between steps (c) and (e), of subjecting the mixture to mechanical treatment so as to remove air from the mixture prior to sedimentation.

10. A method as recited in claim 1 wherein step (b) is practiced by using a strong acid to acidify the fibrous sludge.

11. A method as recited in claim 1 wherein step (b) is practiced by using an acid effluent from a bleaching process.

12. A method as recited in claim 11 wherein the acidification in step (b) is practiced so that the zeta-potential is approximately 0.

13. A method as recited in claim 1 wherein the acidification in step (b) is practiced so that the zeta-potential is approximately 0.

14. A method as recited in claim 1 wherein steps (c) and (d) are practiced by adding an alkaline agent during mixing.

15. A method as recited in claim 14 wherein steps (c) and (d) are practiced by adding lime.

16. A method as recited in claim 1 wherein the effluent in step (c) is an alkaline effluent from a bleaching process, and wherein step (d) is practiced without the addition of any additional alkaline.

17. A method as recited in claim 1 comprising the further step (f), between steps (c) and (e), of removing air from the mixture prior to sedimentation.

18. A method of removing dissolved and colloidal macro-molecular organic substances from effluents from processes used in the manufacture of pulp and paper, comprising the steps of:
(a) mechanical acting upon the cellulose fibers so that the fibers are broken and split open to thereby provide a specific surface greater than 1.3 $m^2/g$;
(b) acidifying the fibers so that the pH thereof is about 1.6-2.5 and the zeta-potential is approximately 0;
(c) mixing a quantity of fibers from step (b) with said effluent containing dissolved and colloidal macromolecular organic substances, the quantity of fibers calculated as solid material being about 1-20 grams per liter of the total quantity of treated effluent and constituting about 0.5-2 times the quantity of COD in the effluent;
(d) if necessary, adjusting the pH of the mixture of fibers and effluent to about 4.5-6.0; and
(e) subjecting the mixture of fibers and effluent to sedimentation to achieve precipitation of the fibers with macro-molecular organic substances adhered thereto.

19. A method as recited in claim 18 comprising the further step (f), between steps (d) and (e), removing air from the mixture of fibers and effluent.

20. A method of removing dissolved and colloidal macro-molecular organic substances from effluents from processes used in the manufacture of pulp and paper, comprising the steps of:
(a) mechanical acting upon the cellulose fibers so that the fibers are broken and split open to thereby provide a specific surface greater than 1.3 $m^2/g$;
(b) acidifying the fibers so that the pH thereof is about 1.6-2.5 and the zeta-potential is approximately 0;
(c) mixing a quantity of fibers from step (b) with alkaline effluent from a bleaching process, the quantity of fibers calculated as solid material being about 1-20 grams per liter of the total quantity of treated effluent and constituting about 0.5-2 times the quantity of COD in the effluent;
(d) removing air from the mixture of effluent and fibers; and
(e) subjecting the mixture of fibers and effluent to sedimentation to achieve precipitation of the fibers with macro-molecular organic substances adhered thereto.

* * * * *